United States Patent
Kanczuzewski

[11] Patent Number: 6,086,299
[45] Date of Patent: Jul. 11, 2000

[54] CARGO LOAD-LOCK

[75] Inventor: Thomas E. Kanczuzewski, South Bend, Ind.

[73] Assignee: Logi-Stick, Inc., Notre Dame, Ind.

[21] Appl. No.: 08/779,382

[22] Filed: Jan. 7, 1997

[51] Int. Cl.⁷ .................................................. B60P 7/15
[52] U.S. Cl. ............................................ 410/152; 410/143
[58] Field of Search .................... 410/152, 143–145, 410/149, 150, 151, 121; 248/577, 200.1, 205.3, 264

[56] References Cited

U.S. PATENT DOCUMENTS

| | | |
|---|---|---|
| 969,002 | 8/1910 | Teachout . |
| 1,401,419 | 12/1921 | Mcnally . |
| 1,951,660 | 3/1934 | Klaudt . |
| 2,124,082 | 7/1938 | Reifer . |
| 2,414,160 | 1/1947 | Moon . |
| 2,464,080 | 3/1949 | Hankins . |
| 2,467,681 | 4/1949 | McKinney . |
| 2,697,631 | 12/1954 | Miller . |
| 2,752,864 | 7/1956 | McDougal, Sr. et al. ............ 410/130 |
| 2,766,704 | 10/1956 | McMahon . |
| 2,912,939 | 11/1959 | Miner, Jr. et al. . |
| 2,980,037 | 4/1961 | Elsner . |
| 3,177,007 | 4/1965 | Oren .................................. 410/129 X |
| 3,344,750 | 10/1967 | Kostrewa ............................. 410/127 |
| 3,559,591 | 2/1971 | Breen et al. .......................... 410/127 |
| 3,590,746 | 7/1971 | Gibson ................................. 410/127 |
| 3,712,663 | 1/1973 | Laven .................................. 410/133 |
| 3,995,565 | 12/1976 | Kersey ................................. 410/151 |
| 4,080,906 | 3/1978 | Brown ................................. 410/130 |
| 4,264,251 | 4/1981 | Blatt .................................... 410/100 |
| 4,278,376 | 7/1981 | Hunter ................................. 410/130 |
| 4,396,325 | 8/1983 | Joice-Cavanagh ................... 410/129 |
| 4,432,678 | 2/1984 | Liebel .................................. 410/151 |
| 4,498,824 | 2/1985 | Kinkle ................................. 410/121 |
| 4,756,498 | 7/1988 | Frye . |
| 4,830,558 | 5/1989 | Sweeney . |
| 4,846,610 | 7/1989 | Schoenleben ......................... 410/96 |
| 4,880,342 | 11/1989 | Pradovic ............................. 410/121 |
| 4,932,817 | 6/1990 | Mattare ................................ 410/152 |
| 4,955,771 | 9/1990 | Bott .................................... 410/94 |
| 4,962,907 | 10/1990 | Gary . |
| 4,982,922 | 1/1991 | Krause . |
| 5,028,184 | 7/1991 | Krause ................................. 410/143 |
| 5,219,251 | 6/1993 | Kanczuzewski ..................... 410/127 |
| 5,281,063 | 1/1994 | Austin, III ........................... 410/151 |
| 5,320,464 | 6/1994 | Long et al. .......................... 410/144 |
| 5,494,389 | 2/1996 | Kanczuzewski ..................... 410/144 |
| 5,688,087 | 11/1997 | Stapleton et al. ................... 410/150 |

FOREIGN PATENT DOCUMENTS 1 209 255   10/1970   United Kingdom .

OTHER PUBLICATIONS

Freight Restraint System Brochure "Barrier of Safety"; Undated, 4 pages.
Shippers Paper Products Co. Brochure "Air Bags Reduce Damage, Materials, Labor and Loading Time."; Mar. 1987, 6 pages.
Packaging Digest "Freight Restraints Make the Grade"; May 1990, 2 pages.
Ty–Guard Installation Pamphlet; Undated, 2 pages.
Bones Securement System "The Breaktrhough Freight Securement System for Truck, Rail, and Container Shipments" Brochure; Undated, 6 pages.

*Primary Examiner*—Stephen T. Gordon
*Attorney, Agent, or Firm*—Barnes & Thornburg

[57] ABSTRACT

A cargo load-lock includes a base with a sleeve extending therefrom and a biasing element located in the sleeve. The biasing element includes a spring arm and a piece of compressible material. A portion of one surface of the base is covered with adhesive. In use, a restraining bar, such as a 2×4, is positioned with its ends in the sleeves of two opposing load-locks. The adhesive is then removed from the base and the load-locks are affixed to the sides of the cargo area of the vehicle. As installed, the biasing element exerts a force along the length of the restraining bar and helps hold it in place. Alternatively, straps can be laced through the handles to restrain the load.

48 Claims, 5 Drawing Sheets

CARGO LOAD-LOCK

BACKGROUND AND SUMMARY OF THE INVENTION

The present invention relates generally to a load-lock, and, in particular to a disposable load restraint mechanism for limiting the shifting of cargo in a trailer.

Semi-trailers, trains and other box-type vehicles are used to haul products across town and across country. On a smaller scale, individuals use pick-up trucks and small trailers to move personal items. Despite the many advantages, moving cargo in a trailer is not without its problems. For example, the cargo is rarely an exact fit with the trailer. Most trailers are cube-like in design, while the cargo may be of most any shape. Even when the cargo is placed in boxes, the boxes often do not fit perfectly into the trailer. Loading of trailers if further complicated by the fact that trailers vary in size. Often, the cubic dimensions of the load being shipped do not exactly equal the cubic dimensions of the trailer. In other words, the load may only partially fill the trailer. When a trailer cannot be fully loaded, or when the cargo being shipped is of unusual dimensions, shifting can occur during transportation. This is highly undesirable, especially when the items being shipped are fragile. Shifting of cargo can also occur when the cargo is being shipped on pallets.

Many items have been developed to limit or restrict the shifting of cargo in trailers. One such item is shown in the brochure "Air Bags Reduce Damage, Materials, Labor and Loading Time" by Shippers Paper Products Company. This brochure describes an inflatable air bag which can be wedged into voids in a loaded trailer. Once in place, the air bag is inflated, thus reducing the available space in the trailer.

Another product used to secure cargo is shown in the Ty-Gard brochure "Freight Restraint System". A double-sided adhesive tape is placed onto sidewalls of a trailer. Strips of flexible industrial fiber are then stuck to the tape and wrapped around the cargo. The two free ends of the flexible strips are then secured together, using a steel tool.

Movable shipping bulkheads can be used to limit cargo shifting. Bulkheads of this type are shown in U.S. Pat. No. 4,080,906 to Brown and U.S. Pat. No. 4,880,342 to Pradovic.

Portable loading braces are shown in U.S. Pat. No. 969,002 to Teachout, U.S. Pat. No. 2,766,704 to McMahon, and U.S. Pat. No. 2,912,939 to Miner, Jr. et al. Generally, all of these braces include a rigid member which is secured to opposing sidewalls of a trailer. These braces can be placed at any vertical height within the trailer to restrict shifting of cargo. The above-cited references each disclose a different means of attaching a rigid member to the sidewalls. The '002 reference includes two telescoping members, which are adjustable using an internal, threaded screw. The two members are expanded until they form a tight friction-fit against the sidewalls. The '704 patent also uses a friction-fit to secure the brace to the trailer. However, this device uses pivotable arms to wedge the brace against the sidewalls. The Miner reference discloses the use of guides which are attached to opposite ends of the rigid member. The guides have fingers thereon, which are adapted to fit into plates secured to the trailer sidewalls.

Accordingly, it is an object of the present invention to provide a cargo load-lock which is relatively lightweight and portable.

Another object of the present invention is to provide a cargo load-lock that can be used at various locations within a trailer.

Still another object of the present invention is to provide a cargo load-lock which requires no tools to install.

Yet another object of the present invention is to provide a cargo load-lock which can be used in compartments of various widths.

These and other objects of the present invention are attained by the provision of a cargo load lock having a base with a front surface, a rear surface, a first side, a second side, a first end and a second end, a sleeve extending from the base, a biasing element. According to one embodiment of the present invention, the biasing element includes a piece of compressible material. The compressible material may be foam. According to another embodiment of the present invention, the biasing element includes a spring arm. The spring arm may extend from a side of the sleeve. The biasing element may be located in the sleeve and may include both compressible material and a spring arm. The compressible material may be located between the spring arm, a side of the sleeve and/or the base. The sleeve may include a frangible portion. A handle may extend from the base.

According to another embodiment of the present invention, a rib may extend from the base to the sleeve. More than one rib may be included. The ribs may extend from the base to different sides of the sleeve.

Other objects, advantages and novel features of the present invention will become apparent from the following detailed description of the invention when considered in conjunction with the accompanying drawings.

DESCRIPTION OF THE PREFERRED EMBODIMENTS

Figure 1:
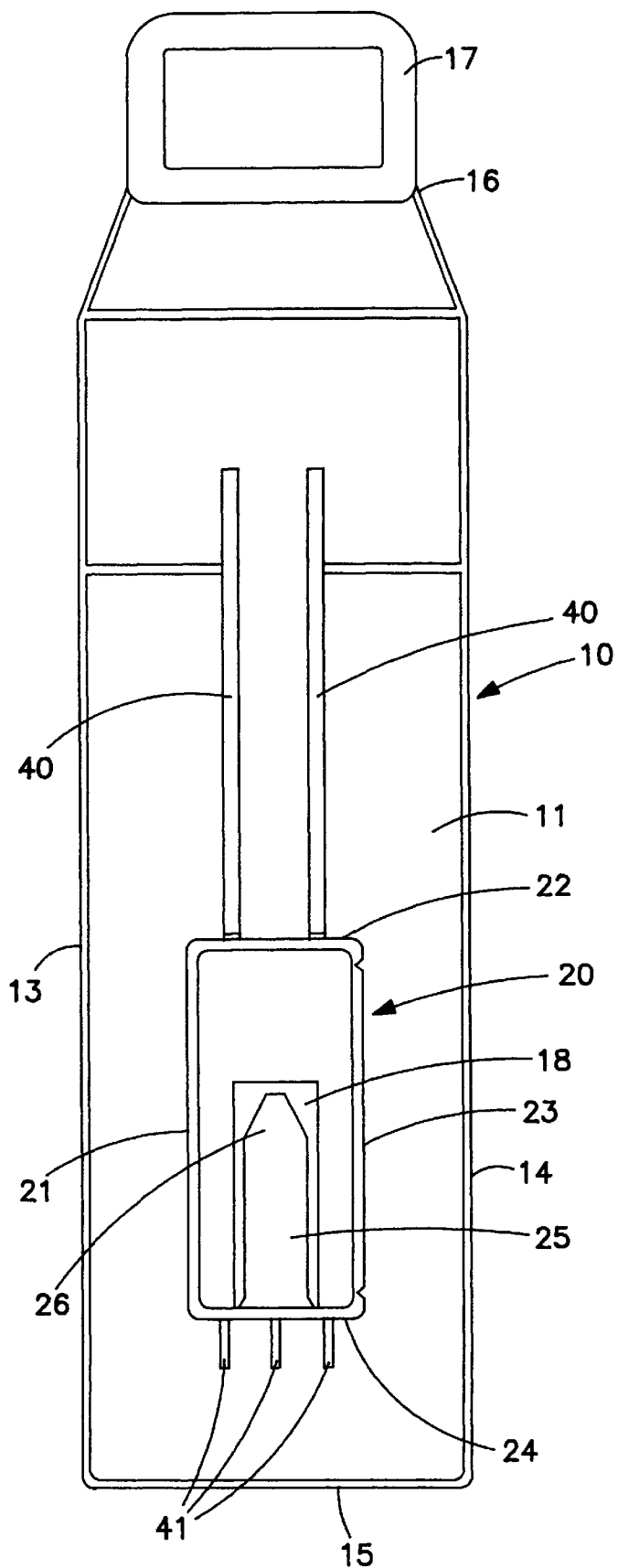
FIG. 1 is a front plan view of a cargo load lock according to the present invention.
Figure 2:
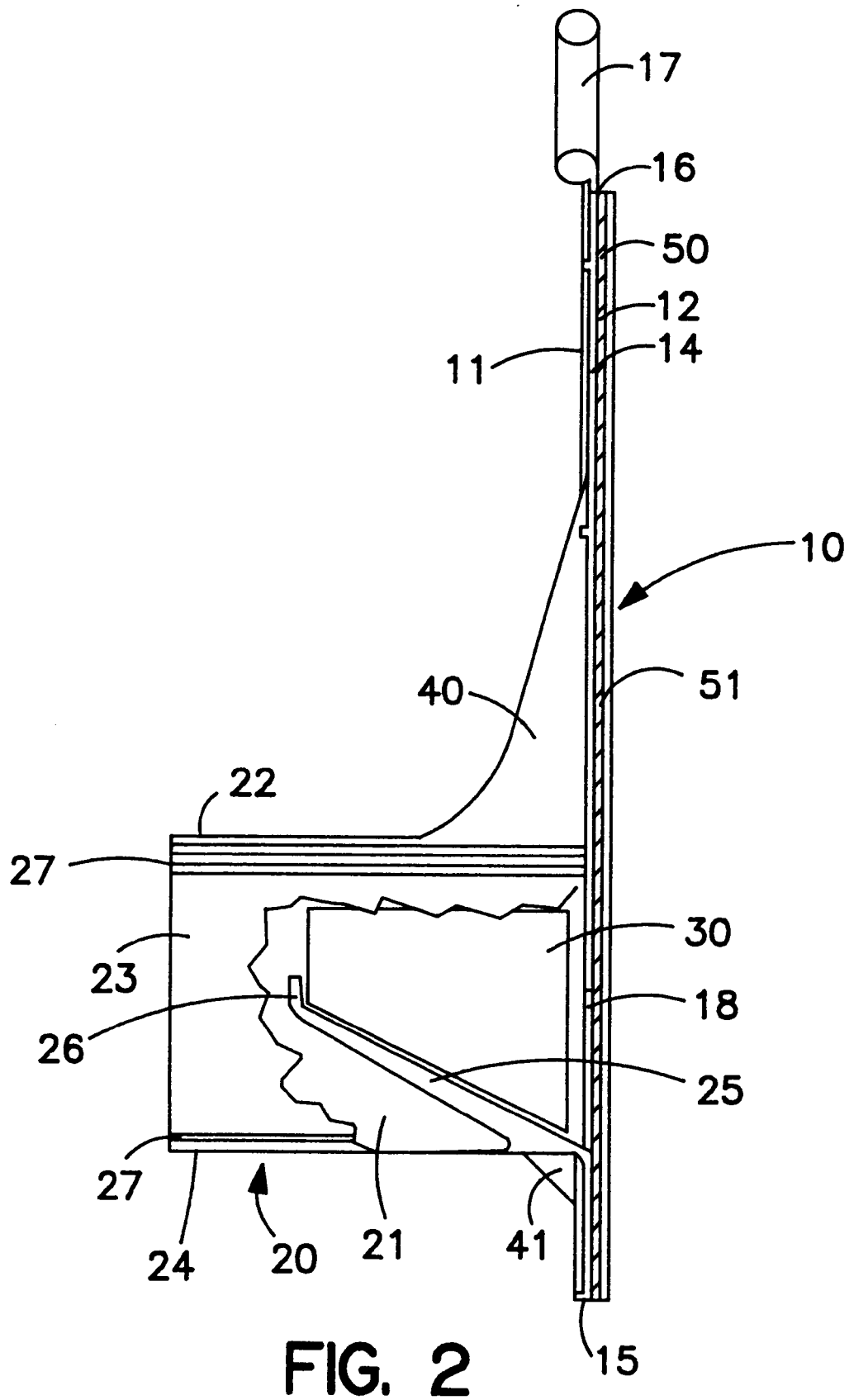
FIG. 2 is a partial cut-away, side plan view of the cargo load lock shown in FIG. 1.

Referring now to the drawings, FIGS. 1 and 2 show respectively, front and side plan views of an embodiment of a cargo load-lock according to the present invention including a base 10 and sleeve 20. Base 10 is preferably of a generally flat, rectangular shape, and includes front surface 11, back surface 12, first side 13, second side 14, first end 15 and second end 16. A handle 17 extends from second end 16. Extending from front surface 11 and at a generally right angle thereto is sleeve 20. Sleeve 20 is preferably hollow and can be of most any cross-sectional configuration. In the embodiment shown, sleeve 20 has a generally rectangular cross-section and includes first side 21, second side 22, third side 23 and fourth side 24. A spring 25 in the form of a flexible arm extends upward from fourth side 24 of sleeve 20 and at an angle thereto. Spring arm 25 terminates in an upturned lip 26. A compressible, resilient piece of material 30, such as foam, is positioned between spring arm 25, second side 22 of sleeve 20 and front surface 11 of base 10. Together, spring arm 25 and foam 30 act as a biasing element and help hold a cargo restraining bar in place, as described below. Note that foam 30 is not shown in FIG. 1 so that opening 18 in base 10 may be seen. Opening 18 facilitates removal of foam 30, if necessary, by providing a place to insert a finger or other object to push foam 30 out of sleeve 20. Sleeve 20 further includes two indentations 27 extending along third side 23 thereof. Indentations 27 assist in breaking away third side 23 after use of the cargo load lock as described below. In other words, the portion of third side 23 between indentations 27 is frangible. Base 10 and sleeve 20 are preferably made from plastic, such as ABS plastic.

A first plurality of ribs 40 extend from front surface 11 of base 10 to second side 22 of sleeve 20. Ribs 40 reinforce the connection between base 10 and sleeve 20, prevent bowing of base 10 in use, and distribute force to base 10. A second plurality of ribs 41 extend from front surface 11 of base 10 to fourth side 24 of sleeve 20 and reinforce the connection between sleeve 20 and base 10.

The cargo load lock of the present invention is designed to be attached directly to the sidewall of a vehicle, as described below. For this purpose, in the embodiment shown, adhesive 50 covers at least a portion of back surface 12 of base 10. A cover strip 51 covers adhesive 50. Any number of compositions can be used as adhesive 50. However, adhesive 50 should provide resistance to shear forces, but allow the cargo load lock to be peeled off of the vehicle sidewall. Butyl based, acrylic based and rubber based adhesives are effective bonding agents. Butyl based adhesives work well as an adhesive when the cargo restraint is attached to a sidewall made of steel, but are not as effective as a bonding agent when the sidewall is wooden. Acrylic based adhesives are more effective when used with wood than with steel. All of these compositions may be strengthened by applying an additional bonding solution to the sidewall. For example, by applying a spray adhesive to the sidewall prior to affixing the cargo restraint, the resulting bond will be stronger. The most preferred spray adhesive is Super 77 Spray Adhesive, produced by 3M. To further enhance the bond between the cargo restraint and the sidewall, it may be beneficial to prepare sidewall 16 with a cleaning solvent.

Figure 3:
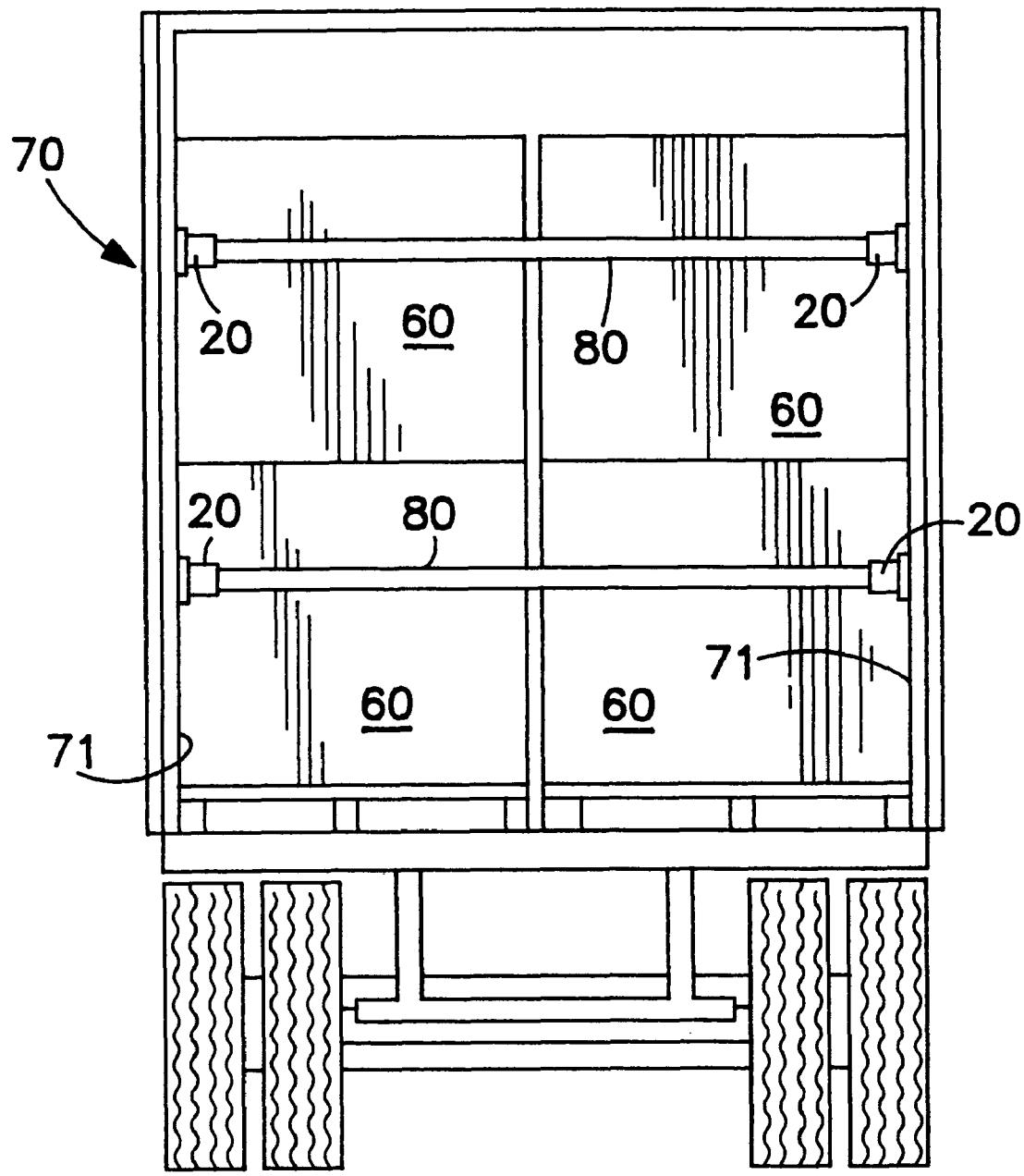
FIG. 3 shows a cargo load lock according to the present invention in use.
Figure 4:
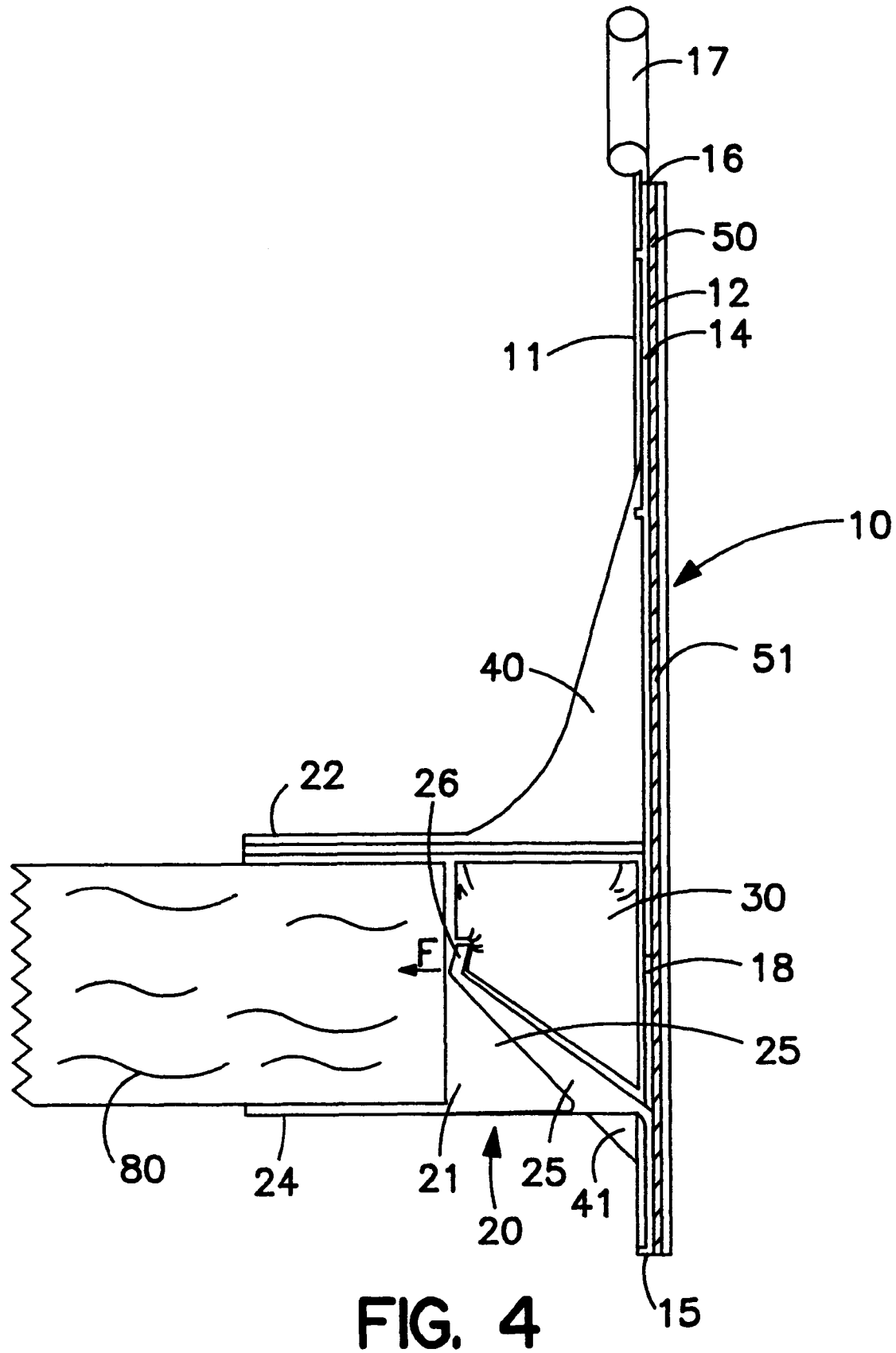
FIG. 4 is a partial cut-away view showing one end of a restraining bar inserted in a load lock.
Figure 5:
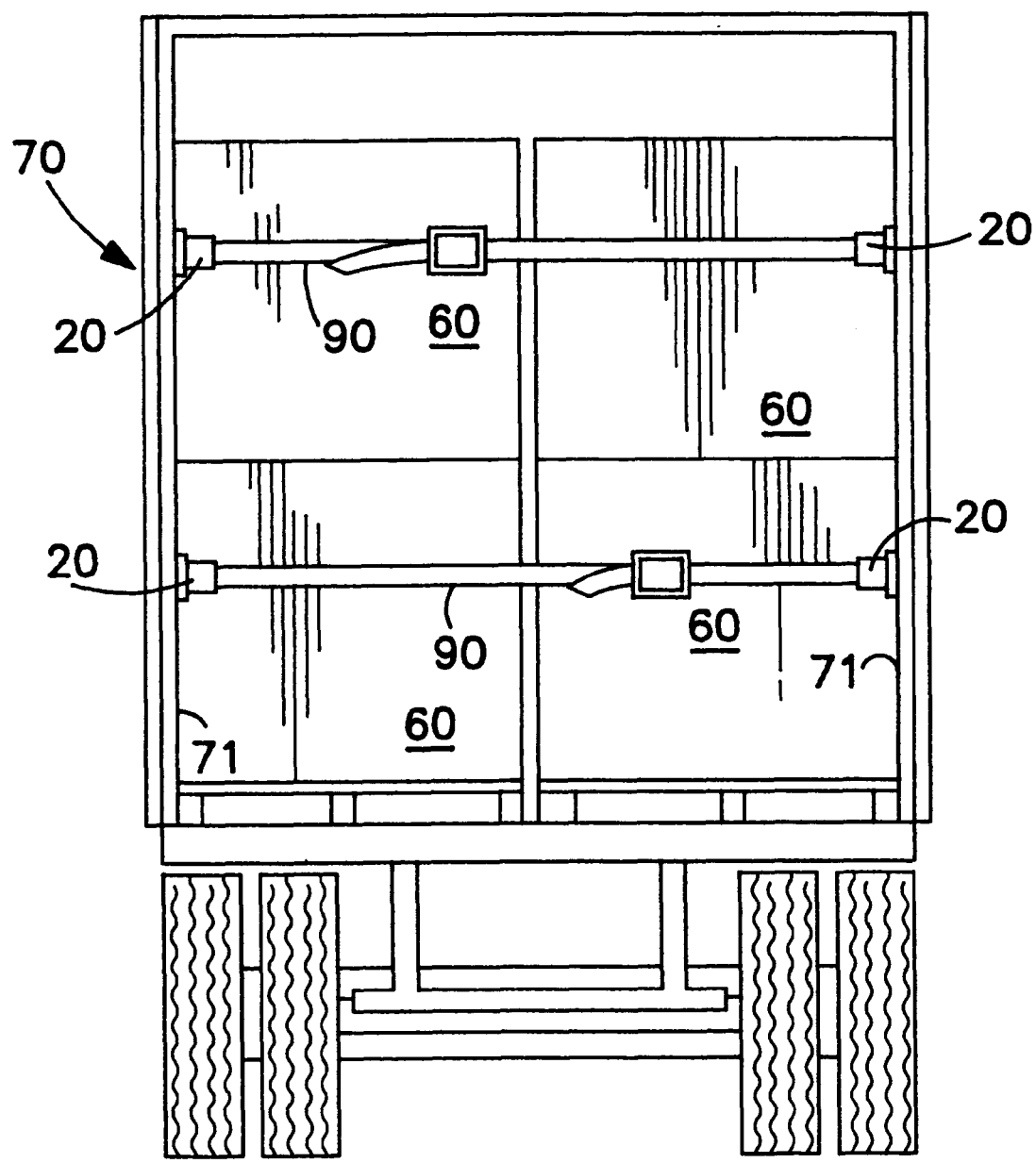
FIG. 5 shows a cargo load lock according to the present invention in use.

To use the cargo restraint of the present invention, cargo 60 is loaded in a vehicle compartment 70 as shown, for example, in FIG. 3. A rigid restraining bar 80, such as a 2×4, having a length substantially the entire width of compartment 70 is then selected and a cargo load lock according to the present invention is placed on each end of bar 80 such that the ends are disposed in sleeves 20. Preferably, bar 80 will be of a length longer than the distance between the outer up-turned lips 26 of spring arms 25 when they are positioned on the side walls 71 of compartment 70. Cover strips 51 are then peeled away and base 10 of each cargo load lock is pressed against sidewalls 71 in the desired location. Preferably, the load locks are placed in a generally horizontal position. However when sidewalls 71 include vertical ribs, it may be preferable to position the load lock vertically. In either position, it is preferred that bar 80 be mounted so as to provide maximum strength against horizontal motion. When using a 2×4, this would include positioning the board such that the short side faces cargo 60. Note that when in position in the vehicle, bar 80 compresses spring arms 25 and foam 30 (as shown in FIG. 4) in both load locks. Thus, spring arms 25 and foam 30 apply a biasing force along the length of bar 80, as shown by arrow F. This assists holding bar 80 in position. When the load locks are mounted as shown in FIG. 3, the bar 80 prevents shifting of cargo.

To remove the load lock, third side 23 of sleeve 20 is broken away by inserting a screwdriver or similar device between bar 80 and third side 23 and lifting the screwdriver so as to break third side 23 along indentations 27. Bar 80 can then be lifted from sleeve 20. After bar 80 is removed, the devices are moved from sidewalls 71 by grasping handle 17 and pulling away from sidewall 71. The load locks are then discarded.

As an alternative to using a rigid restraining bar 80 in sleeves 22 to restrain cargo 60, a flexible restraining strap 90 may be laced through handles 17 on opposing load locks and clamped together to restrain cargo 60 in place. If straps are used, handles 17 should be placed closer to cargo 60 than sleeves 20.

Although the present invention has been shown and described in detail the same is to be taken by way of example only and not by way of limitation. Numerous changes can be made to the present invention without departing from it. For example, the shape of base 10 and sleeve 20 can be changed. So can the shape of spring arm 25 and compressible material 30. Other biasing elements can be used in place of spring arm 25 and compressible material 30. Restraining bars 80 other than a 2×4 can be used. Accordingly, the scope of the present invention is to be limited only by the terms of the claims appended hereto.

What is claimed is:

1. A cargo load lock, comprising:
    a base having a front surface, a rear surface, a first side, a second side, a first end and a second end;
    a sleeve extending from the base, the sleeve including a frangible portion; and
    a biasing element located at least partially within the sleeve.

2. A cargo load lock according to claim 1, wherein the biasing element includes a piece of compressible material.

3. A cargo load lock according to claim 1, wherein the biasing element includes a spring arm.

4. A cargo load lock according to claim 2, wherein the compressible material is located in the sleeve.

5. A cargo load lock according to claim 3, wherein the spring arm is located in the sleeve.

6. A cargo load lock according to claim 1, wherein the biasing element includes a spring arm and a piece of compressible material located adjacent the spring arm.

7. A cargo load lock according to claim 6, wherein the sleeve has at least two sides, the spring arm extends from one of the sides, and the compressible material is located between the spring arm, another of the sides of the sleeve and the base.

8. A cargo load lock according to claim 1, further including at least one rib extending from the base to the sleeve.

9. A cargo load lock according to claim 1, wherein the sleeve has at least two sides and further including at least one rib extending from the front surface of the base to one of said sides of the sleeve and at least one rib extending from the front surface of the base to another of the sides of the sleeve.

10. A cargo load lock according to claim 1, further including a handle extending from one of said ends of the base.

11. A cargo load lock according to claim 1, wherein the sleeve has at least one side and further including at least one indentation formed in the side.

12. A cargo load lock according to claim 2, wherein the compressible material is foam.

13. A cargo load lock according to claim 2, further comprising an opening in the base to facilitate removal of the compressible material.

14. A cargo load lock, comprising:
    a base having a first surface, a second surface, a first side, a second side, a first end and a second end;

a sleeve extending from the first surface of the base, the sleeve having a first side, a second side, a third side and a fourth side;

a resilient arm extending from the first side of the sleeve; and a biasing member located within the sleeve.

15. A cargo load lock according to claim 14, wherein the arm extends from the first side of the sleeve at an angle.

16. A cargo load lock according to claim 14, wherein the first side of the sleeve is generally perpendicular to the first surface of the base.

17. A cargo load lock according to claim 14, wherein the sleeve includes a hollow interior and the arm extends within the interior.

18. A cargo load lock according to claim 14, wherein the biasing member includes a compressible member.

19. A cargo load lock according to claim 14, wherein the biasing member is located between the arm and one of said sides of the sleeve.

20. A cargo load lock according to claim 14, wherein the arm includes an upturned end and the biasing member is located between the upturned end and the first surface of the base.

21. A cargo load lock according to claim 14, wherein the sleeve includes a frangible portion.

22. A cargo load lock according to claim 14, wherein the biasing member includes foam.

23. A cargo load lock according to claim 14, further including an opening in the base to facilitate removal of the biasing member.

24. A cargo load lock according to claim 14, wherein the biasing member includes at least one trapezoidal side.

25. A cargo load lock according to claim 14, wherein the frangible portion is located on one of said sides of the sleeve.

26. A cargo load lock according to claim 21, wherein the frangible portion is defined at least in part by at least two indentations.

27. A cargo load lock, comprising:

a base;

a sleeve extending from the base, the sleeve including a top, bottom, two sides and an opening for receiving a load retaining bar;

an arm extending from the bottom of the sleeve; and a biasing member located between the arm and the top of the sleeve.

28. A cargo load lock according to claim 27, wherein the arm extends from the bottom of the sleeve at an angle.

29. A cargo load lock according to claim 27, wherein the arm is flexible.

30. A cargo load lock according to claim 27, wherein the arm includes a lip.

31. A cargo load lock according to claim 30, wherein the biasing member is located between the lip and the base.

32. A cargo load lock according to claim 27, wherein the sleeve includes a hollow interior and the arm extends within the interior.

33. A cargo load lock according to claim 27, wherein the biasing member includes a compressible member.

34. A cargo load lock according to claim 27, wherein the sleeve includes a frangible portion.

35. A cargo load lock according to claim 27, wherein the biasing member includes foam.

36. A cargo load lock according to claim 27, further including an opening in the base to facilitate removal of the biasing member.

37. A cargo load lock according to claim 27, wherein the biasing member includes at least one trapezoidal side.

38. A cargo load lock according to claim 34, wherein the frangible portion is located on one of said sides of the sleeve.

39. A cargo load lock according to claim 34, wherein the frangible portion is defined at least in part by at least two indentations.

40. A cargo load lock, comprising:

a base having a front surface, a rear surface, a first side, a second side, a first end and a second end;

a sleeve extending from the base;

a biasing element located at least partially within the sleeve, the biasing element including a piece of compressible material; and an opening in the base to facilitate removal of the compressible material.

41. A cargo load lock according to claim 40, wherein the biasing element includes a spring arm.

42. A cargo load lock according to claim 40, wherein the compressible material is located in the sleeve.

43. A cargo load lock according to claim 41, wherein the spring arm is located in the sleeve.

44. A cargo load lock according to claim 41, wherein the sleeve has at least two sides, the spring arm extends from one of the sides, and the compressible material is located between the spring arm and another of the sides of the sleeve.

45. A cargo load lock according to claim 41, wherein the sleeve has at least two sides, the spring arm extends from one of the sides, and the compressible material is located between the spring arm, another of the sides of the sleeve and the base.

46. A cargo load lock according to claim 41, further including at least one rib extending from the base to the sleeve.

47. A cargo load lock according to claim 40, wherein the sleeve includes a frangible portion.

48. A cargo load lock according to claim 40, wherein the compressible material is foam.

* * * * *